(12) United States Patent
Javagal et al.

(10) Patent No.: US 9,769,014 B2
(45) Date of Patent: Sep. 19, 2017

(54) NETWORK LINK USE DETERMINATION BASED ON NETWORK ERROR DETECTION

(71) Applicant: Cisco Technology, Inc., San Jose, CA (US)

(72) Inventors: Srinivas Chandrashekar Javagal, Mountain View, CA (US); John Dany Ah Sue, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 335 days.

(21) Appl. No.: 14/451,551

(22) Filed: Aug. 5, 2014

(65) Prior Publication Data
US 2016/0043893 A1    Feb. 11, 2016

(51) Int. Cl.
*H04L 12/24* (2006.01)
*H04L 12/26* (2006.01)

(52) U.S. Cl.
CPC ...... *H04L 41/0659* (2013.01); *H04L 43/0811* (2013.01); *H04L 43/0847* (2013.01)

(58) Field of Classification Search
None
See application file for complete search history.

(56) References Cited

U.S. PATENT DOCUMENTS

| | | | | |
|---|---|---|---|---|
| 2006/0072593 A1* | 4/2006 | Grippo | ............... | H04L 12/5695 370/409 |
| 2006/0098725 A1* | 5/2006 | Rhee | ............... | H04B 3/48 375/222 |
| 2010/0039957 A1* | 2/2010 | Kotrla | ............... | H04L 41/5009 370/253 |
| 2012/0170467 A1* | 7/2012 | Bencheck | ............... | H04L 41/5025 370/252 |

* cited by examiner

*Primary Examiner* — Wei Zhao
*Assistant Examiner* — Ronald H Davis
(74) *Attorney, Agent, or Firm* — Meunier Carlin & Curfman LLC

(57) ABSTRACT

A system and methods for determining whether to use a network link are described. In an exemplary embodiment, an apparatus may detect a fault indication relating to a network link and identify a time interval during which to check a status of the network link. The apparatus may also divide the time interval into a plurality of sub-intervals and check, at the sub-intervals, whether the fault indication remains for the network link. Further, the apparatus may discontinue using the network link upon detecting the fault indication at a plurality of the sub-intervals.

20 Claims, 4 Drawing Sheets

NETWORK LINK USE DETERMINATION BASED ON NETWORK ERROR DETECTION

BACKGROUND

Ensuring efficient use of networking resources is an increasingly important design priority for computer networks as the amount of data being transmitted rises. One challenge in network operation is determining when it is appropriate to stop using a network link due to problems with data transmission. Reacting too quickly to a network error by taking down a network link can lead to lost bandwidth in cases where the error may quickly disappear. On the other hand, continuing to attempt data transmissions using a faulty link results in decreased reliability.

A debouncing algorithm can be used to detect when a link is down. For example, a device may receive an indication of an error with a data transmission and then wait for a defined time interval. After the interval, the device checks to see if the fault remains. If the fault does remain, the link will be taken down and not used. If, however, the fault clears, the link can continue to be used for ongoing and future data transmissions.

This approach can be used for determining whether a link should be taken down when the link is inherently stable. An example would be where a network link with a low bit error rate where the cable simply becomes disconnected. In that situation, checking for a persistent fault after a defined interval may appropriately indicate that the link has been broken. However, in the context of a debouncing algorithm, a network link that has a higher bit error rate may be taken down prematurely even though it can still pass some data. For example, checking for a fault indication only once may identify a continued fault and cause the network link to be taken down even though some data can still be transmitted or even though it may only be encountering a temporary issue, such as noise. This can cause a network link to repeatedly switch between an online and an offline state.

Moreover, some data transmissions do not require delivering a complete data set without any errors. Even a faulty link can, in some situations, still be used as a backup or for non-critical data delivery. An approach that simply waits a defined interval and checks for a remaining fault can inappropriately lead to taking down a network link.

BRIEF DESCRIPTION OF DRAWINGS

Like reference numbers and designations in the various drawings indicate like elements.

DESCRIPTION OF EXAMPLE EMBODIMENTS

Overview

A system and methods for determining whether to use a network link are described. In an exemplary embodiment, an apparatus may detect a fault indication relating to a network link and identify a time interval during which to check a status of the network link. The apparatus may also divide the time interval into a plurality of sub-intervals and check, at the sub-intervals, whether the fault indication remains for the network link. Further, the apparatus may discontinue using the network link upon detecting the fault indication at a plurality of the sub-intervals.

Example Embodiments

Figure 1:
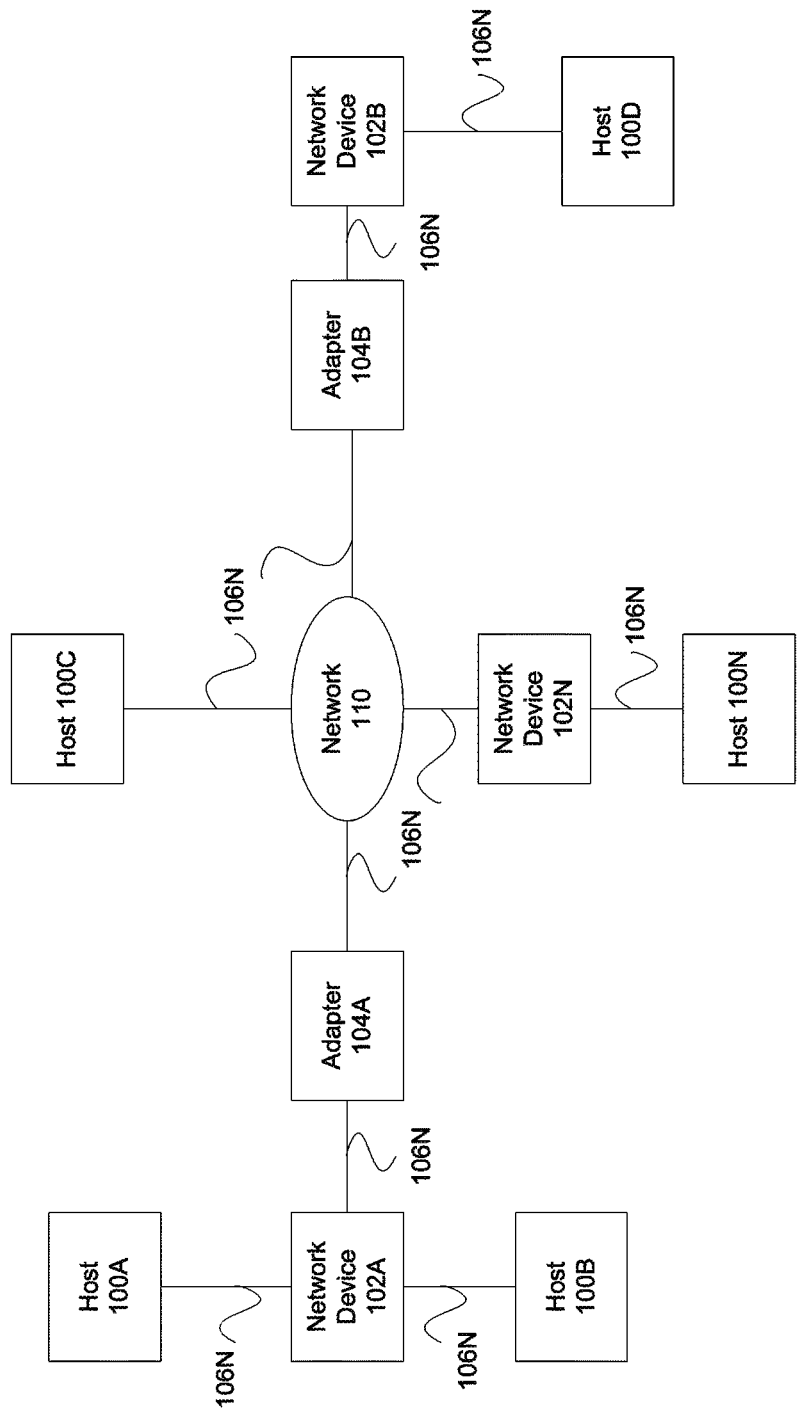
FIG. 1 is a block diagram of an example environment for detecting a network error and determining whether to use a network link.

FIG. 1 illustrates an exemplary block diagram of a system for detecting a network error and determining whether to use a network link. The system may include a network 110, hosts 100A, 100B, 100C, 100D, network devices 102A and 102B, and adapters 104A and 104B. In one implementation, network devices 102A and 102B may be network switches, and hosts 100A-N may be personal computers, servers, laptop computers, network devices, or any other type of network-connectable computing devices. The network devices and hosts may be configured as computing devices discussed below with regard to FIG. 4. Network devices 102A-N may also be part of hosts 100A-N, and may also be, for example, a network interface card.

FIG. 1 is an example system configuration, and many other configurations are possible that include more or fewer devices than shown in FIG. 1. For example, systems may include any number of routers, switches, hubs, gateways, computing devices, and any other network devices connected to network 110. Additionally, systems can include a plurality of source network devices and a plurality of destination network devices.

Network 110 may be any type of communication network such as, for example, the Internet. The components illustrated in FIG. 1 may be communicatively connected using links 106N in a variety of manners according to different protocols and using various physical mediums, including both wired and wireless communications. While illustrated as a single line 106N, each illustrated network link 106N may include a plurality of network links, which may be of the same or different types. Network 110 may include a variety of connections, such as twisted pair cabling, optical fiber, coaxial, Ethernet, Wi-Fi, WiMAX, 3G or 4G. Although not illustrated, one of ordinary skill will appreciate that network 110 may include additional networks, such as local area networks (LANs), wide area networks (WANs) or metropolitan area networks (MANs).

Network devices 102A and 102B may be apparatuses configured to detect a network error and determine whether to use a network link 106N, as will be described in more detail below. Network devices 102A-N may be communicatively connected to network 110 directly or through an adapter 104A or 104B. Network devices 102A and 102B may include, for example, an optical fiber connection to adapters 104A and 104B, which may be wavelength division multiplexing adapters. In this exemplary embodiment, network 110 may include one or more wavelength division multiplexer systems and links to facilitate communications. Adapters 104A and 104B may be part of or separate from network devices 102A and 102B, and similarly, network devices 102A and 102B may be part of or separate from hosts 100A, 100B, and 100D. Network links 106N therefore may be heterogeneous links that begin as a laser over an optical fiber connection, are converted to electrical connection by adapters 104A or 104B, travel through network 110, and are reconverted back to an optical fiber connection for delivery. It will be appreciated that in the example where a separate network device 102A or 102B is unnecessary, hosts 100A-N may configure and detect a network error and determine whether to use one of network links 106N.

Figure 2:
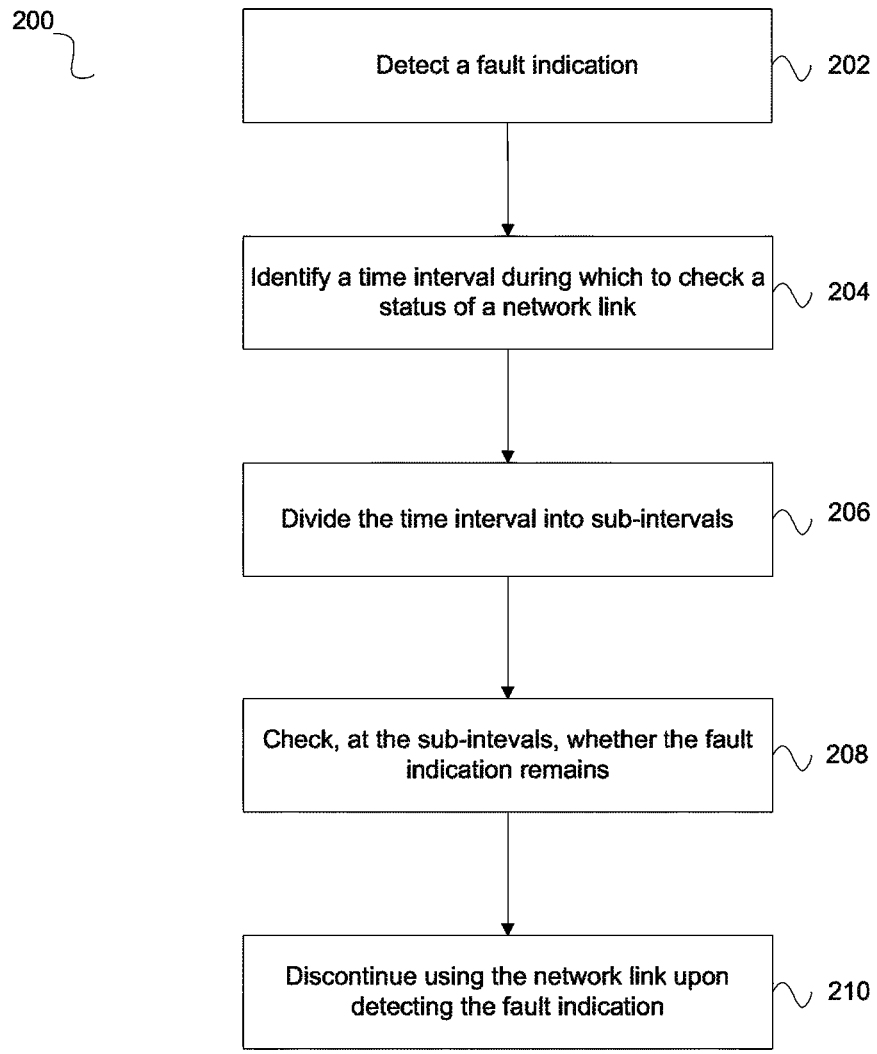
FIG. 2 is a flow diagram illustrating the method of one embodiment for detecting a network error and determining whether to use a network link.

FIG. 2 is a flow diagram illustrating a method of the first embodiment of the invention. Method 200 begins at step 202 with detecting a fault indication relating to the network link. The fault indication may identify any type of problem that could impede data flow or cause data to become unusable during transmission over network 110. For example, a fault indication may indicate that a bit error rate has been exceeded, such as an acceptable bit error rate defined in standards for Ethernet connections. Other examples of a fault indication include determining that a network link has become unplugged, determining that a cyclic redundancy check has failed, determining that data transmitted over the network link has become unusable, such as when the beginning or end of a data transmission cannot be identified, and a number of other faults as appreciated by a person of ordinary skill.

Faults may occur either remotely or locally. For example, if host 100A transmits data through network device 102A to host 100D via network device 102B, network device 102B may detect a fault received from network device 102A. From the perspective of network device 102B, the error may be considered a remote fault. In the exemplary embodiment of an optical fiber connection, the transmitting host 100A or network device 102A may send a special character indicating that it is encountering a fault condition, such as defined in the IEEE 802.3 standards. Receiving network device 102B or host 100D in this example may see light on the optical fiber connection, but be unable to identify normal characters indicating a proper transmission. The transmitting side may also transmit a fault indication when it is not receiving light to indicate to the receiving side that an error may exist on network link 106N. A remote fault character can be sent to indicate that a transmitting side has encountered a local fault.

An example of a local fault may include not being able to detect light on network link 106N, which may indicate that the link has become disconnected. Other examples of a local fault include being able to detect light on an optical fiber connection but not being not being able to detect a bit stream, or being able to detect a bit stream but not delineate individual characters within the bit stream. Detecting a fault over an Ethernet connection may be done by the physical medium attachment sublayer, such as when light is detected without a clock signal. In another exemplary embodiment, light and the clock may be received, but the physical coding sublayer of Ethernet may detect a fault because it cannot determine where characters start and end.

Faults may be detected by, for example, a network interface card, a processor, or any combination of the two. Hardware may initially detect a problem with the network link and provide a notification to software executing on a network device to handle the fault. While some exemplary fault conditions have been provided, it is to be understood that additional fault indications may be detected or identified.

Next, at step 204, method 200 identifies a time interval, also referred to as a debounce period, during which to check a status of the network link after receiving the fault indication. The time interval may be preconfigured or configurable, and can have different durations depending on the type of network and, for example, an acceptable bit error rate for a particular network link 106N. In one exemplary embodiment, the time interval may be one hundred milliseconds, although other intervals may be chosen.

As step 206, method 200 divides the time interval into a plurality of sub-intervals. Step 206 may occur either before or after receiving an indication of a fault, and a variety of frequencies and durations of sub-intervals may be used. Three examples of dividing the time interval into sub-intervals include a defined period of time between each sub-interval, an exponentially decreasing sub-interval, and an exponentially increasing sub-interval.

When a fault indication is initially detected, transmissions on a network link may not have stabilized. To avoid falsely determining that the fault indication has cleared, the first sub-interval may come some period of time after the fault indication has been detected, such as one-half of the time interval. For example, if the time interval is one hundred milliseconds, the first sub-interval may begin at fifty milliseconds. Then, subsequent sub-intervals maybe chosen up until the end of the time interval. Additional details of choosing and implementing sub-intervals will be provided with reference to FIGS. 3A and 3B, below.

In one exemplary embodiment, sub-intervals may have a constant duration, such as ten milliseconds. Accounting for an initial fifty millisecond delay, sub-intervals may occur every ten milliseconds from fifty to one hundred milliseconds. Of course, other intervals may be used, and the first sub-interval may occur at the beginning, one third of the way through, or any other duration through the time interval for detecting a network fault.

At step 208, network device 102A-N may check, at the sub-intervals, whether the fault indication remains for the network link. A fault indication, whether local or remote, may clear as the problem resolves. Accordingly, network device 102N may repeatedly check whether the fault indication remains up until the end of the time period. By repeatedly checking whether a fault indication remains, the probability that a network link will be taken down can be reduced, allowing a network link experiencing bit errors to remain in service.

A cutoff time may also be established so that the checking completes once the end of the time interval approaches. For example, when using an exponentially decreasing or increasing sub-interval, as described in more detail below, the last check may occur once the time remaining in the time interval is less than ten milliseconds. As will be appreciated, other cutoff durations may be used.

At step 210, method 200 may discontinue using the network link 106N upon detecting the fault indication at the sub-intervals. As illustrated in FIG. 1, a plurality of network links 106N may connect a particular network device 102N to network 110. If a particular link encounters a fault that persists for a plurality of or all sub-intervals, such as when a bit error rate exceeds a threshold, network device 102N may discontinue using that network link. Instead, a different network link 106N may be chosen for future communications until the fault indication clears. If, however, the fault indication has not been detected at the sub-intervals, network link 106N may remain in service. This allows a network link that experiences some faults to remain in service for less critical communications that can withstand a higher bit error rate. Accordingly, if a network link 106N experiences fault indications at less than a majority of or all of the sub-intervals, network device 102A-N may continue using the network link, make it a secondary or backup link, or use it for less critical data.

Network device 102N need not determine that a fault has occurred at each of the sub-interval checks to determine that a network link 106N should be taken down. For example, if a majority of checks show a continued fault indication, or three-fourths of the checks show a continued fault indication, network device 102N may discontinue using the network link 106N experiencing a fault. Additional percentages and requirements for determining whether to discontinue using a network link may also be used. If network device 102N determines that the network link 106N should be discontinued, hardware can continue to monitor the network link to determine whether the problem has been resolved, as is understood in the art.

Figure 3A:
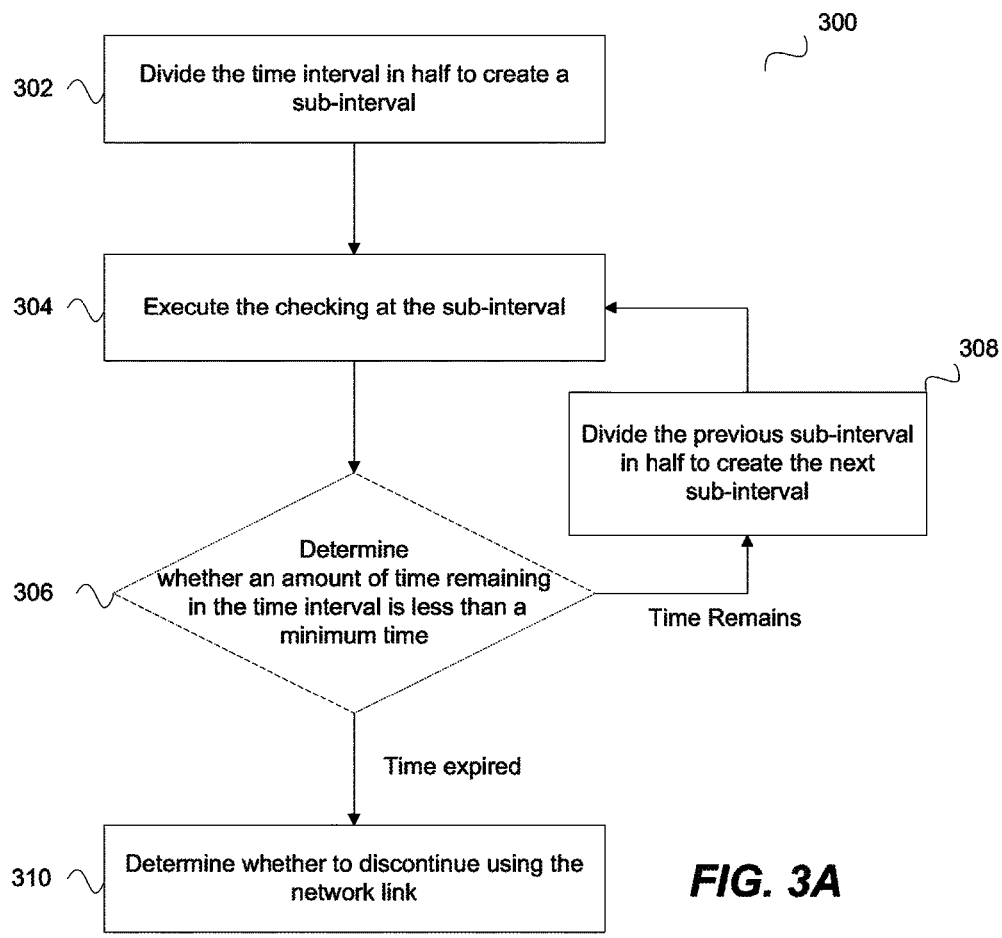
FIG. 3A is a flow diagram illustrating an exemplary method for determining time intervals at which to check whether a fault exists.

FIG. 3A is a flow diagram illustrating an exemplary method 300 for creating the sub-intervals and checking whether a fault exists. At step 302, the time interval may be divided in half to create a first sub-interval. In the exemplary embodiment of a debouncing time interval of one hundred milliseconds, the first sub-interval therefore may occur at fifty milliseconds. Next, at step 304, network device 102N may check for the fault condition at the sub-interval, as described in more detail above with reference to step 208.

At step 306, method 300 may determine whether an amount of time remaining in the time interval is less than a minimum time. The minimum time may be configurable. Assume an exemplary minimum time of ten milliseconds. In this example, the first sub-interval will occur at fifty milliseconds, leaving fifty milliseconds remaining to check whether the fault condition remains. Because additional time remains, method 300 may continue to step 308. The minimum time of ten milliseconds is an exemplary embodiment, but is not limiting.

At step 308 the previous sub-interval may be divided in half to create the next sub-interval. Continuing with the example above, the prior sub-interval occurred at fifty milliseconds, which when divided in half indicates that the next sub-interval will occur in another twenty-five milliseconds. At that time, method 300 checks for the fault indication again (step 304), determines whether the amount of time remaining is less than a minimum time (306), and repeats until the minimum time has been reached.

Figure 3B:
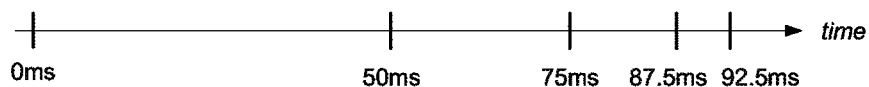
FIG. 3B illustrates an exemplary timeline illustrating dividing a time interval into sub-intervals.

FIG. 3B illustrates an exemplary timeline illustrating dividing the time interval into sub-intervals. The timeline shows that, for an exemplary debounce time interval of one hundred milliseconds, the first sub-interval may occur at fifty milliseconds, the second at seventy-five milliseconds, the third at eighty-seven and a half milliseconds, and the last at ninety-two and a half milliseconds, after which the time remaining will be less than the minimum exemplary time of ten milliseconds. Method 300 may then determine, at step 310, whether to discontinue using the network link, as described previously. Increasing the frequency of checks toward the end of the time interval ensures that a higher bit error rate network link may not be brought down, but a network link encountering a persistent fault such as a disconnection will be discontinued.

The example described in FIGS. 3A and 3B uses an exponentially decreasing sub-interval. The calculation of a sub-interval duration may be represented by:

$$(dN/dt)=0.5*N,$$

where N represents the duration of the current sub-interval and t represents time. Sub-intervals may be calculated in a variety of ways, such as exponentially decreasing, exponentially increasing, or constant. Further, step 306 in this example may be executed either before or after dividing the previous sub-interval in half. Accordingly, in this example, the last sub-interval may occur at eighty-seven and a half milliseconds because the next sub-interval (at ninety two and a half milliseconds) would be less than the minimum time of ten milliseconds, as illustrated in FIG. 3B. Alternatively, method 300 may continue and execute one more check at ninety-two and a half milliseconds. It will therefore be appreciate that the steps illustrated in FIG. 3A need not be executed in the order shown. For example, step 308 may be executed as part of step 302, so that the sub-intervals have been determined prior to the first check for whether a fault condition remains at step 304.

When the logical operations described herein are implemented in software, the process may execute on any type of computing architecture or platform. For example, referring to FIG. 4, an example computing device upon which embodiments of the invention may be implemented is illustrated. In particular, hosts 100A-N and network devices 102A-N (e.g., a switch, router, gateway, etc.) discussed above may be a computing device, such as computing device 400 shown in FIG. 4. Additionally, the logical operations may be in a processor on a network interface card within any of hosts 100N or network devices 102N.

Figure 4:
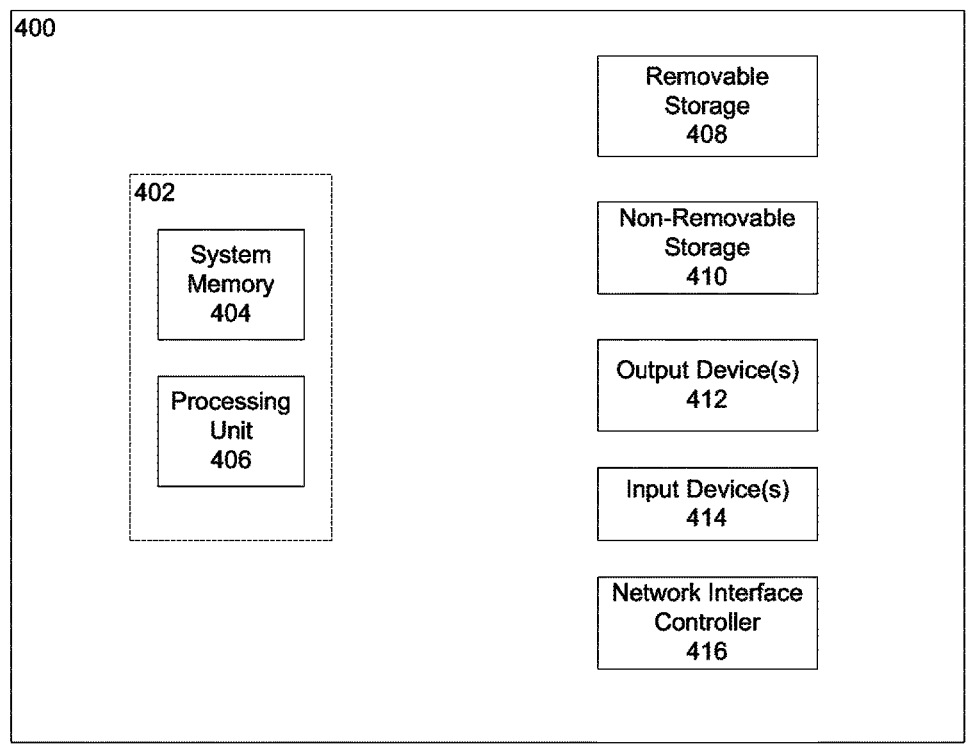
FIG. 4 is block diagram illustrating a network device in accordance with the various embodiments of the invention.

The computing device 400 may include a bus or other communication mechanism for communicating information among various components of the computing device 400. In its most basic configuration, computing device 400 typically includes at least one processing unit 406 and system memory 404. Depending on the exact configuration and type of computing device, system memory 404 may be volatile (such as random access memory (RAM)), non-volatile (such as read-only memory (ROM), flash memory, etc.), or some combination of the two. This most basic configuration is illustrated in FIG. 4 by dashed line 402. The processing unit 406 can optionally be a standard programmable processor that performs arithmetic and logic operations necessary for operation of the computing device 400. Alternatively, the processing unit 406 can optionally be an application specific integrated circuit ("ASIC") that performs arithmetic and logic operations necessary for operation of the computing device 400.

Computing device 400 may have additional features/functionality. For example, computing device 400 may include additional storage such as removable storage 408 and non-removable storage 410 including, but not limited to, magnetic or optical disks or tapes. Computing device 400 may also contain network connection(s) 416 that allow the device to communicate with other devices. Computing device 400 may also have input device(s) 414 such as a keyboard, mouse, touch screen, etc. Output device(s) 412 such as a display, speakers, printer, etc. may also be included. The additional devices may be connected to the bus in order to facilitate communication of data among the components of the computing device 400. All these devices are well known in the art and need not be discussed at length here.

The processing unit 406 may be configured to execute program code encoded in tangible, computer-readable media. Computer-readable media refers to any media that is capable of providing data that causes the computing device 400 (i.e., a machine) to operate in a particular fashion. Various computer-readable media may be utilized to provide instructions to the processing unit 406 for execution. Common forms of computer-readable media include, for example, magnetic media, optical media, physical media, memory chips or cartridges, a carrier wave, or any other medium from which a computer can read. Example computer-readable media may include, but is not limited to, volatile media, non-volatile media and transmission media. Volatile and non-volatile media may be implemented in any method or technology for storage of information such as computer readable instructions, data structures, program modules or other data and common forms are discussed in detail below. Transmission media and network links may include coaxial cables, copper wires and/or fiber optic cables, as well as acoustic or light waves, such as those generated during radio-wave and infra-red data communication. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 406 may execute program code stored in the system memory 404. For example, the bus may carry data to the system memory 404, from which the processing unit 406 receives and executes instructions. The data received by the system memory 404 may optionally be stored on the removable storage 408 or the non-removable storage 410 before or after execution by the processing unit 406.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

While this specification contains many specific implementation details, these should not be construed as limitations on the claims. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

It should be appreciated that the logical operations described herein with respect to the various figures may be implemented (1) as a sequence of computer implemented acts or program modules (i.e., software) running on a computing device, (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The various embodiments of the invention offer many advantages over the prior art. The various embodiments of the invention allow for efficiently detecting a network fault and determining whether to use a network link. The determination can be made based on a plurality of checks to see whether a network fault remains, ensuring that a network link that encounters only a temporary error can continue in service.

The invention claimed is:

1. A method for determining whether to use a network link, comprising:
   upon detecting a fault indication relating to the network link, checking, at a plurality of intervals, whether the fault indication remains for the network link, wherein the plurality of intervals comprises a first interval corresponding to a first time period, a second interval corresponding to a second time period that is less than the first time period, and a third interval corresponding to a third time period that is less than the second time period; and
   discontinuing use of the network link upon detecting the fault indication at all of the checked plurality of intervals.

2. The method of claim 1, comprising:
   wherein each of the intervals has a duration of one-half of a previous interval; and
   wherein detection of the fault indication is performed at all of the checked intervals until a check at a minimum interval time is performed.

3. The method of claim 1, wherein the plurality of intervals are set by:

establishing the first time interval as a time corresponding to one-half of the time interval during which the status check of the network link is checked;
checking whether the fault indication remains at the first interval; and
performing additional checking at subsequent intervals after the first interval until a minimum time interval is checked wherein each subsequent interval is determined as a division of a previous time interval by a value of two.

4. The method of claim 1, comprising:
identifying a time interval during which to check the status of the network link; and
dividing the time interval into a plurality of sub-intervals, wherein the time interval is configurable.

5. The method of claim 1, wherein the network link comprises an optical fiber link implementing Ethernet.

6. The method of claim 1, wherein the fault indication indicates that a bit error rate has exceeded a predetermined threshold.

7. The method of claim 1, further comprising discontinuing the network link upon detecting the fault indication at each of the checked intervals.

8. A non-transitory computer readable medium having computer executable instructions stored thereon, wherein execution of the instructions by a processor, cause the processor to:
upon detection of a fault indication relating to the network link, check, at a plurality of intervals, whether the fault indication remains for the network link, wherein the plurality of intervals comprises a first interval corresponding to a first time period, a second interval corresponding to a second time period that is less than the first time period, and a third interval corresponding to a third time period that is less than the second time period; and
discontinue use of the network link upon detecting the fault indication at all of the checked plurality of intervals.

9. The non-transitory computer-readable medium of claim 8, wherein each of the intervals has a duration of one-half of a previous interval; and
wherein detection of the fault indication is performed at all of the checked intervals until a check at a minimum interval time is performed.

10. The non-transitory computer-readable medium of claim 8, wherein the instructions, when executed by the processor, cause the processor to:
establish the first time interval as a time corresponding to one-half of the time interval during which the status check of the network link is checked;
check whether the fault indication remains at the first interval; and
perform additional checking at subsequent intervals after the first interval until a minimum time interval is checked wherein each subsequent interval is determined as a division of a previous time interval by a value of two.

11. The non-transitory computer-readable medium of claim 8, wherein the instructions, when executed by the processor, cause the processor to:
identify a time interval during which to check the status of the network link; and
divide the time interval into a plurality of sub-intervals, wherein the time interval is configurable.

12. The non-transitory computer-readable medium of claim 8, wherein the network link comprises an optical fiber link implementing Ethernet.

13. The non-transitory computer-readable medium of claim 8, wherein the fault indication indicates that a bit error rate has exceeded a predetermined threshold.

14. The non-transitory computer-readable medium of claim 8, wherein the instructions, when executed by the processor, cause the processor to discontinue using the network link upon detecting the fault indication at each of the checked intervals.

15. An apparatus configured with a de-bouncing circuit to determine whether to use a network link, the apparatus comprising:
a processor; and
a memory communicatively connected to the processor the memory having computer-executable instructions stored thereon, wherein execution of the instructions, cause the processor to:
upon detection of a fault indication relating to the network link, check, at a plurality of intervals, whether the fault indication remains for the network link, wherein the plurality of intervals comprises a first interval corresponding to a first time period, a second interval corresponding to a second time period that is less than the first time period, and a third interval corresponding to a third time period that is less than the second time period; and
discontinue use of the network link upon detecting the fault indication at all of the checked plurality of intervals.

16. The apparatus of claim 15, wherein each of the intervals has a duration of one-half of the previous interval; and
wherein detection of the fault indication is performed at all of the checked intervals until a check at a minimum interval time is performed.

17. The apparatus of claim 15, wherein instructions, when executed by the processor, cause the processor to:
establish the first time interval as a time corresponding to one-half of the time interval during which the status check of the network link is checked;
check whether the fault indication remains at the first interval; and
perform additional checking at subsequent intervals after the first interval until a minimum time interval is checked wherein each subsequent interval is determined as a division of a previous time interval by a value of two.

18. The apparatus of claim 15, wherein the network link comprises an optical fiber link implementing Ethernet.

19. The apparatus of claim 15, wherein the fault indication indicates that a bit error rate has exceeded a predetermined threshold.

20. The apparatus of claim 15, wherein the instructions, when executed by the processor, cause the processor to discontinue using the network link upon detecting the fault indication at each of the checked intervals.

* * * * *